United States Patent [19]
Baus

[11] Patent Number: 4,598,479
[45] Date of Patent: Jul. 8, 1986

[54] TIMING WHEEL FOR CARD ENCODER

[75] Inventor: René Baus, Rancho Palos Verdes, Calif.

[73] Assignee: American Magnetics Corporation, Carson, Calif.

[21] Appl. No.: 794,174

[22] Filed: Nov. 1, 1985

Related U.S. Application Data

[62] Division of Ser. No. 214,166, Dec. 8, 1980.

[51] Int. Cl.$^4$ .......................... G11B 15/18; G01B 3/12
[52] U.S. Cl. ............................................ 33/129; 360/2
[58] Field of Search ................ 33/125 M, 129, 132 R, 33/132 A, 133, 134 R, 134 A, 136, 141 R, 141.5, 142; 384/420, 427; 360/2

[56] References Cited

U.S. PATENT DOCUMENTS 3,914,789 10/1975 Coker et al. ............................ 360/2
4,259,699 3/1981 Yoshida ............................... 360/2 X Primary Examiner—Harry N. Haroian
Attorney, Agent, or Firm—Marmorek, Guttman & Rubenstein

[57] ABSTRACT

Apparatus for magnetically encoding a card which includes a timing wheel frictionally engaging the card as the card is moved along a slot. The wheel has about its peripheral annulus a series of evenly spaced magnetic timing bits which are read out by a read head located adjacent the annular surface of the wheel. As the card moves along the slot, the frictional engagement rotates the wheel in a precise one-to-one spatial relationship between the position of the card and the rotative position of the wheel, and hence of the rate at which the timing bits are picked up by the read head. The output from the read head is interfaced with a unique card code to cause coding bits to be applied by a write head to the card as it continues to move along the slot. The position of the code bits on the card are precisely determined by the timing bits through an interfacing circuit which includes a series of AND gates. In this way the code is very accurately and precisely laid onto a magnetic stripe on the card, irrespective of variations in the velocity of the card as it is manually moved along the slot.

1 Claim, 9 Drawing Figures

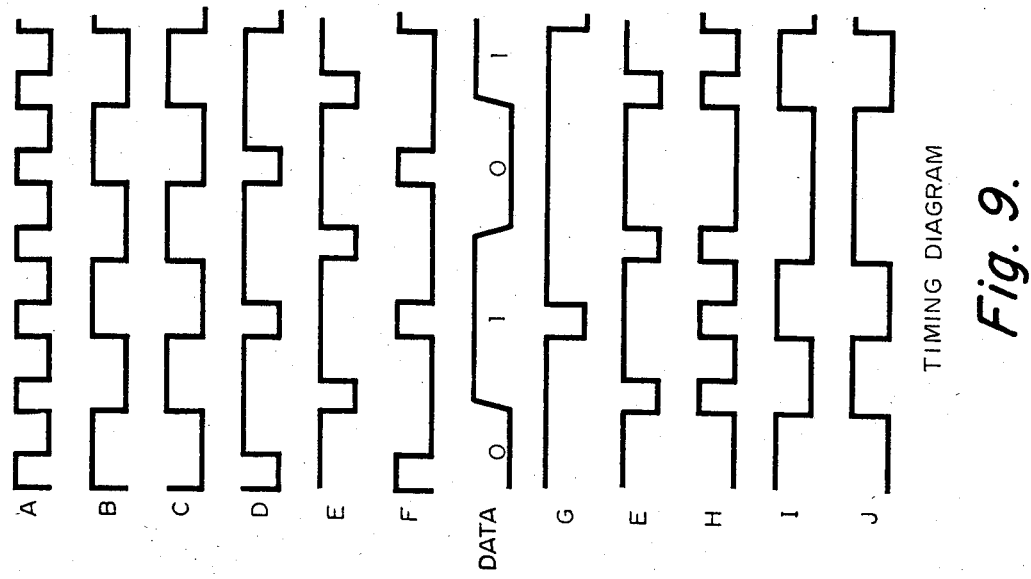
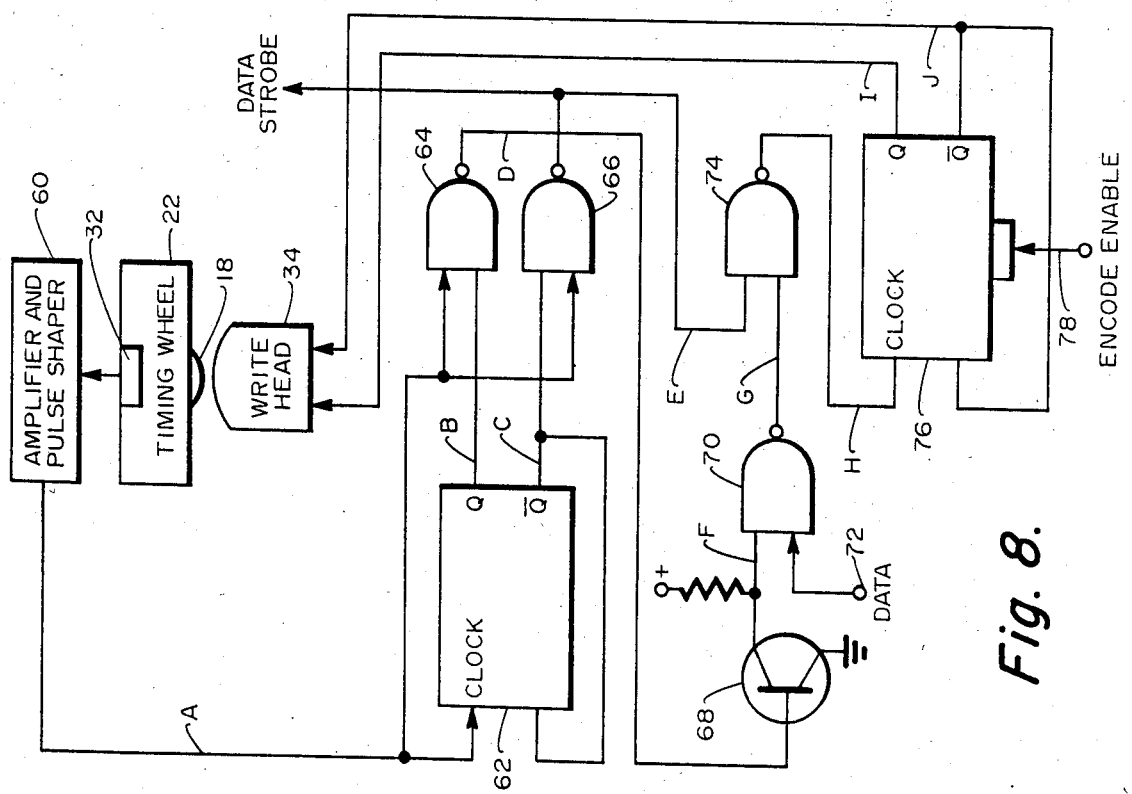
Fig. 9.
Fig. 8.

TIMING WHEEL FOR CARD ENCODER

CROSS REFERENCE TO RELATED PATENT APPLICATION

The present application is a division of patent application Ser. No. 214,166, filed Dec. 8, 1980.

BACKGROUND OF THE INVENTION

In the encoding, typically magnetic encoding, of identification cards, as for example credit cards, it is important that the coding imparted to the longitudinal magnetic strip on the card be accurately and precisely spaced along the longitudinal length of the magnetic stripe. It is current practice to have cards encoded at a multitude of stations operated by a variety of operators having varying skill and aptitude. Typically the cards are moved along a slot in an encoding machine or mechanism and the code is imparted along the length of the magnetic stripe by one or more writing heads one one or more tracks. The cards are typically moved manually along the slot, with inevitable variation in card velocity. Since it is important that the coding be imparted to the stripe at precise points along the stripe, it is necessary to provide some mechanism for accurately and precisely sensing the instantaneous longitudinal spatial position of the card as it moves along the slot.

U.S. Pat. No. 3,914,789 of Coker describes a sensing wheel or timing disc which is rotated by frictional contact with the card as the card moves along the slot. The timing disc is provided with visible timing marks adjacent its circumference which are sensed or read out by a photosensor as the wheel is rotated. Rotation of the wheel is done by a hub axially connected to the wheel which is of appreciably smaller diameter than the wheel itself. The circumference of the hub bears against the card, and is turned thereby. Use of optical or visible indicators necessitates the employment of a relatively large wheel in order to achieve the necessary annular separation and resolution between the timing marks. Were the timing wheel itself to bear against the card, the circumference needed to accommodate a sufficient number of timing indices would be much larger than the length of the magnetic stripe on the card-hence, the necessity for driving the timing wheel through a significantly smaller driving hub which actually contacts the card itself.

SUMMARY OF THE INVENTION

In accordance with the present invention, a single timing wheel is provided having a circumferential strip of magnetizable material that carries the magnetic timing marks evenly distributed circumferentially around the wheel. The periphery of the wheel itself bears against the card and is rotated thereby as the card is moved along the slot. The magnetic timing marks may be applied to the circumferential annulus of the wheel with extremely high resolution, so that the circumference of the wheel may approximate the length of the magnetic stripe on the card and still contain the necessary number of timing bits, while allowing the wheel periphery to bear directly against the card itself in the encoding operation.

BRIEF DESCRIPTION OF THE DRAWINGS

A preferred embodiment of the present invention is shown in the figures wherein:

FIG. 8 is a schematic block diagram showing the system or circuit employing the apparatus of the present invention;

FIG. 9 is a series of wave forms or timing diagrams illustrating the signals that appear at various points in the circuit of FIG. 8.

DETAILED DESCRIPTION OF THE PREFERRED EMBODIMENT

Figure 1:
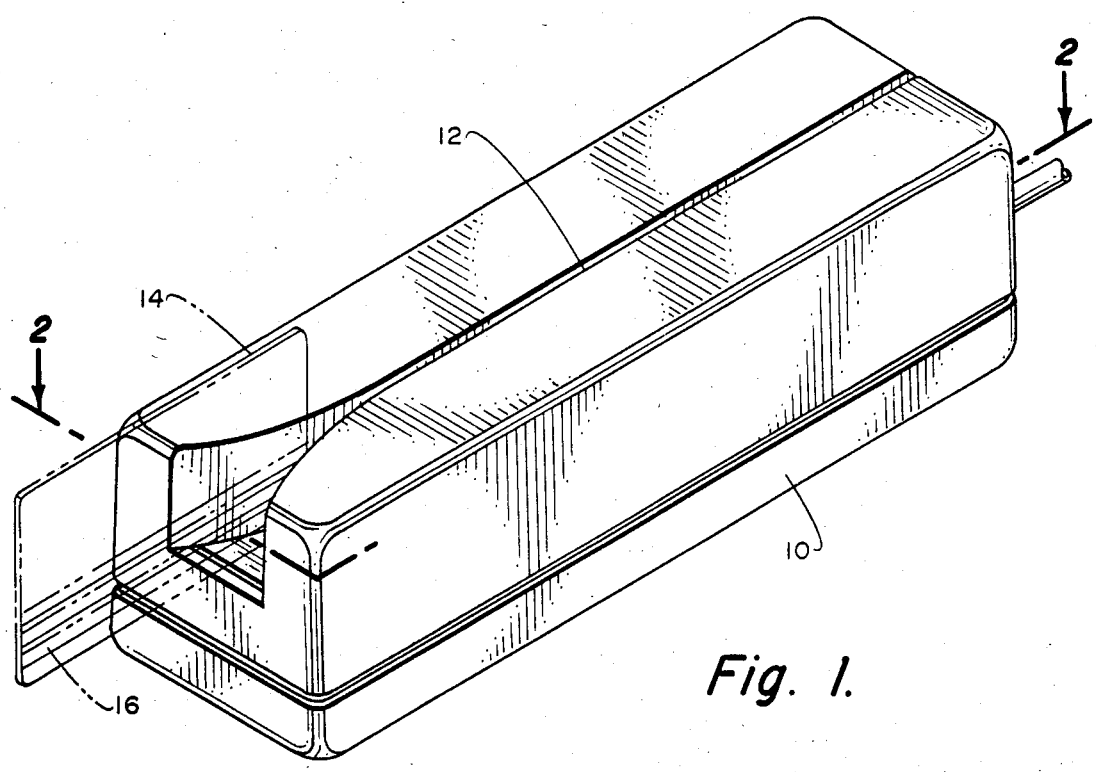
FIG. 1 is a perspective view of the encoding apparatus or mechanism.
Figure 3:
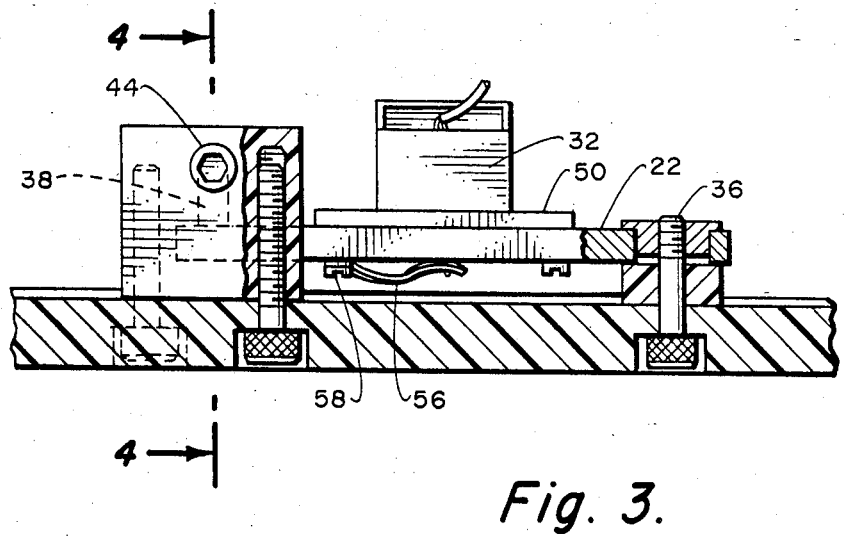
FIG. 3 is a fragmentary elevational section taken on line 3—3 in FIG. 2.

Referring to the figures, 10 designates a base or housing having in its upper surface a longitudinal slot 12 constituting a track means along which a record member, for example a card 14, may be manually moved from one end of the slot 12 to the other. The card 14 has one or more longitudinal stripes 16 of magnetizable material which may be selectively magnetized, typically in the form of binary bits imparted onto the card as discrete changes in magnetic strength or polarity as one moves longitudinally along the stripe 16.

A timing wheel 18 is rotatably mounted with respect to the base 10 with its circumferential periphery tangentially intercepting the slot 12, as shown at 20, in position to be frictionally rotated by the card 14 as the card is moved longitudinally along the slot 12. The timing wheel 18 is journaled in a holder 22 about a vertical axle 24.

Around the periphery 26 of the wheel 18 and somewhat radially inward of the periphery, is an annular strip 28 of magnetized material having timing indices indicated schematically at 30 and consisting of discrete changes in magnetic strength or polarity. These timing indices, in the form of binary bits, are spaced uniformly circumferentially along (around) the annulus. Diametrically opposite area 20 is a magneto-electric pickup means, or read head 32, in position to respond to the magnetic timing indices 30, as a given index 30 passes beneath the head 32. The pickup or read head 32 transduces the changing magnetic field represented by the timing indices 30 into electric pulses as the wheel 18 is rotated by frictional contact with the longitudinally moving card 14. The timing pulses, which have their source in the pickup 32, are interfaced with, and constitute control signals for, data signals or pulses; and the combination is then applied to a writing means in the form of a write head 34 positioned adjacent the stripe 16 on the card 14. Head 34 applies the encoding to the stripe 16 on card 14, in the form of magnetic binary bits. The circuit means, shown schematically in FIG. 8, comprises essentially an appropriate arrangement of and gates, such that the binary data is applied in a strict time sequence determined by the pulses generated from the rotating wheel 18.

Figure 5:
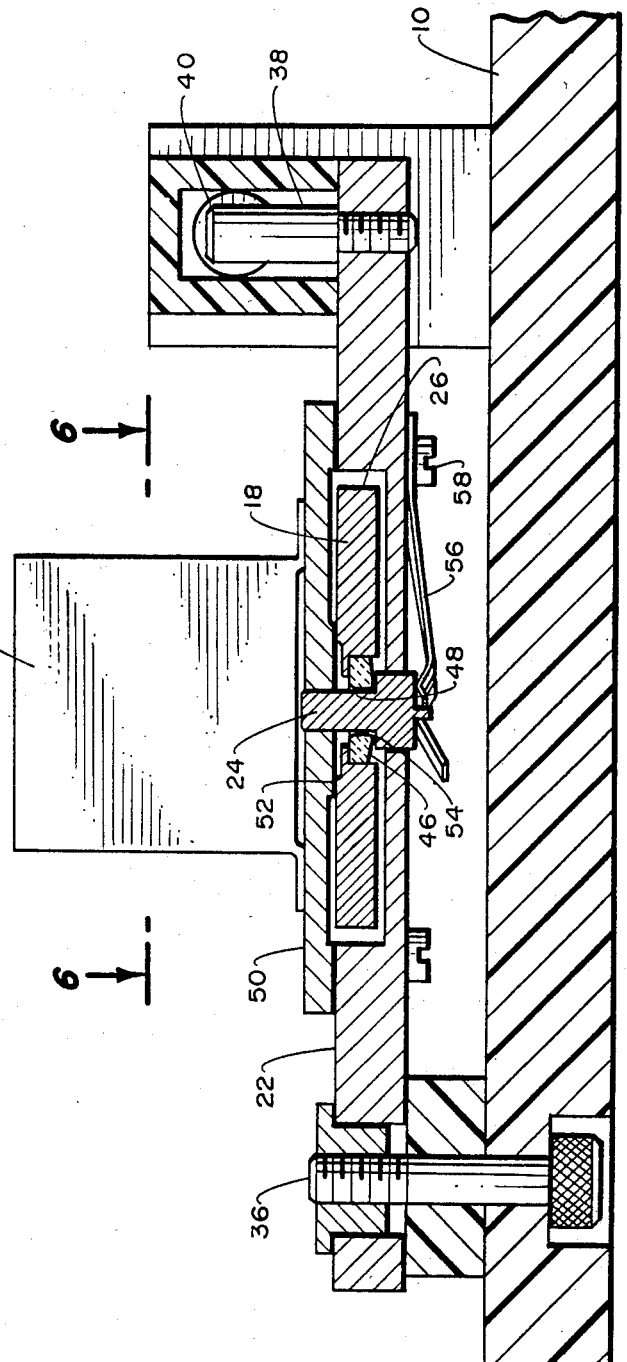
FIG. 5 is a fragmentary elevational section taken on line 5—5 in FIG. 4.
Figure 4:
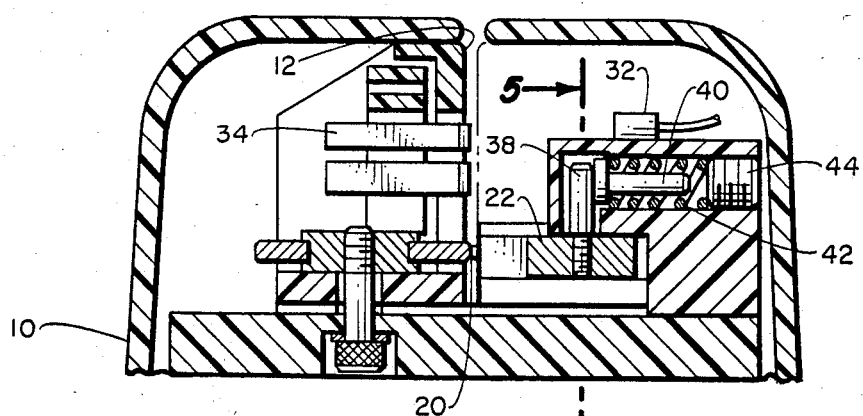
FIG. 4 is a cross-section of the apparatus taken on line 4—4 in FIG. 3.
Figure 6:
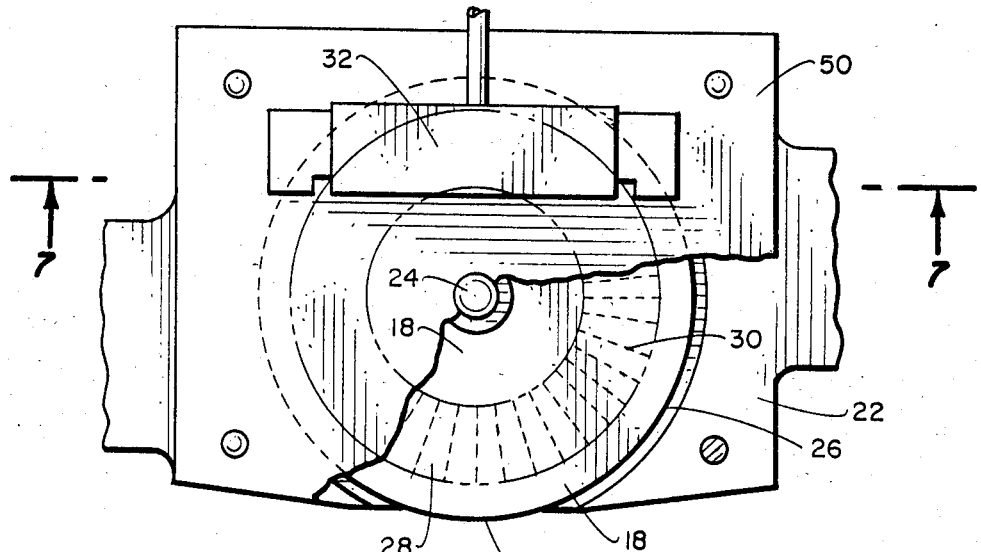
FIG. 6 is a fragmentary plan section taken on line 6—6 in FIG. 5.
Figure 7:
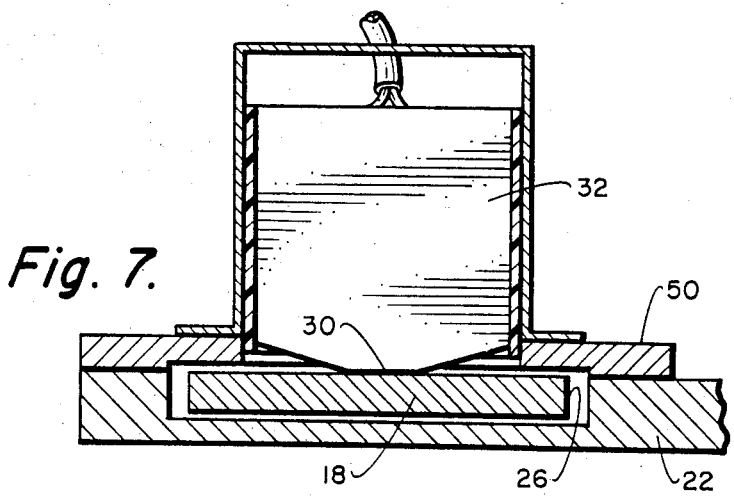
FIG. 7 is an elevational cross-section taken on line 7—7 in FIG. 6.

To ensure a uniform relationship between the periphery 26 of the wheel 18 and the card 14, as the card rotates the wheel, the frame 22 in which the wheel 18 is journaled is mounted in the base or housing 10 in such a manner that wheel 18 can move slightly back and forth at right angles to the card 14. This maintains uniform contact between wheel and card and compensates for undulations in the surface of the stripe 16 on the card 14. This is achieved by mounting one end of the holder or frame 22 for rotation about a pivot in the form of a mounting bolt 36, the other end being spring biased toward the slot 12, as shown in FIGS. 4 and 5. To this end the holder 22 is provided with an upstanding pin 38 against which bears a button 40 biased by a spring 42, accessible and adjustable by a recessed set screw 44. The action of the spring 42, as noted, places a uniform bias on the wheel 18, through the axle 24 and holder 22, against the card 14, as the card is moved manually along the slot 12.

Figure 2:
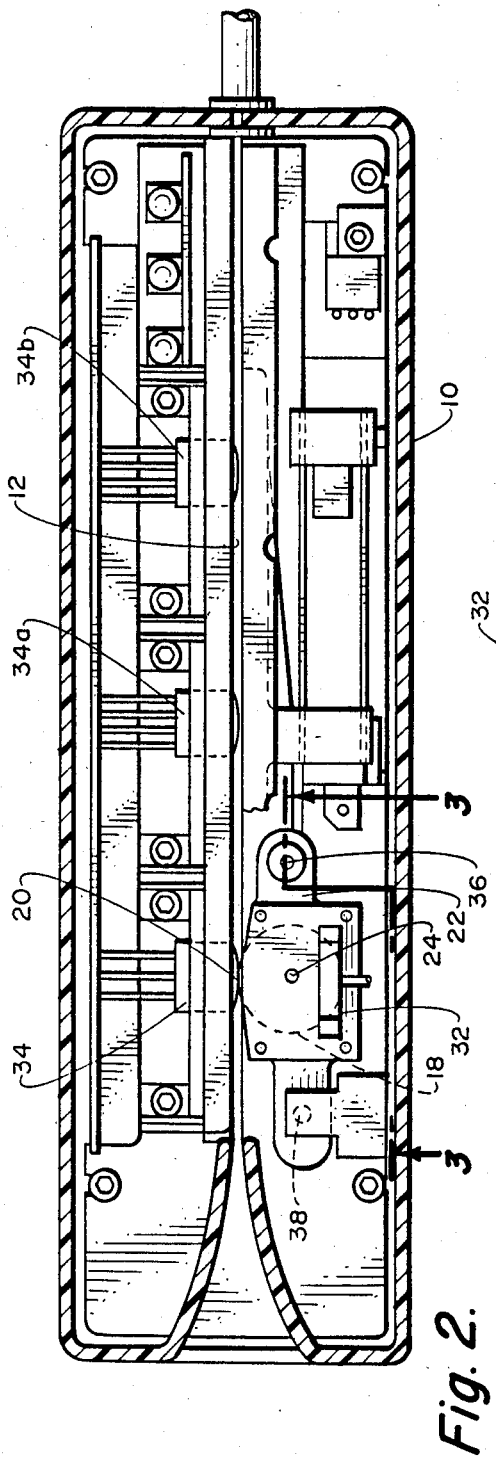
FIG. 2 is a sectional plan taken on line 2—2 in FIG. 1.

As shown in FIG. 2, the apparatus may be provided with a plurality of write heads 34a and 34b, in accordance with well-known techniques.

For accuracy and precision in applying the timing signals to the circuit, it is desirable that the mounting of the wheel 18 be such as to minimize any wobbling or nutating of the wheel 18 as it is engaged rollably by the card 14. To this end, as shown in FIG. 5, the wheel 18 is provided with a central, ring-like bearing member 46, having a central axle hole 48, through which passes the axle 24. The axle 24 is mounted to slide axially in the holder 22 and in the top plate 50, secured to and forming a cover member for the holder 22. Wheel 18 is provided with an annular thrust-bearing surface on its upper face which cooperates with a facing annular bearing surface on the underside of plate 50, as shown at 52; and the bearing member 46 is provided with an annular thrust-bearing surface on its lower face, which cooperates with an annular shoulder formed on the bottom of the axle or pin 24, as shown at 54. A leaf spring 56, secured to the underside of the holder 22 by a bolt 58, presses upwardly on the bottom end of the axle pin 24 and biases the two annular thrust faces 52 and 54 together so as to effect a uniform rotational mounting for the wheel 18 within the holder 22 and minimize any wobbling of the wheel 18. The lower surface of the annular bearing ring 46 is preferably laid out on the arc of a sphere and the opening 48 in the annulus 46 is preferably curved in the manner of a toroid, as shown in FIG. 5, to the end that the wheel 18 may seat uniformly on the bearing surfaces 52 and 54.

The interfacing between the timing pulses generated from the timing wheel 18 and the unique data pulses or signals to be applied to the stripe 16 on the card 14 is effected through the circuit shown schematically in FIG. 8. From the pickup or read head 32, the pulses are fed through an amplifier and pulse shaper 60 and emerge as the timing pulses shown at A (FIGS. 8 and 9). These pulses actuate a flip-flop 62, which puts out the inverse pulses B and C. These are fed through respective and gates 64 and 66, which also receive the timing pulses A. Output D from gate 64 is fed through an inverting transistor 68, in the form of pulses F, to another and gate 70, the other terminal of which receives the unique data pulses from the data input terminal 72. These data pulses are strobed from a source of unique data information by applying the output E from the and gate 66 to the source of data information. The combination of the data pulses at 72 and the timing pulses at F, in the and gate 70, produces the pulses G, which are then combined with the strobe pulses E in the and gate 74, to produce the pulses H. These contain the unique data content from 72, precisely timed in accordance with the timing indices derived from the timing wheel 18. The pulses H are applied through another flip-flop 76, switched on and off, if desired, by an encode enable signal 78, to produce dual write pulses I and J that drive the write head 34.

The accuracy and resolution of the recording output from the head 34 is enhanced by designing the circuit so that the periodicity of the encoded data (FIG. 9) is greater than that of the timing pulses F by an integral factor. In this way the higher precision inherent in the pulses F is incorporated into the write pulses or control signals I and J applied to the head 34.

What is claimed is:

1. Mounting for a spatial measurement wheel comprising:
    a wheel having a circumferential periphery adapted to rollably engage a surface to be spatially measured, a central axle hole, and a pair of thrust bearing surfaces circumjacent said hole on opposite sides of said wheel;
    housing means for mounting said wheel;
    axle means passing through said hole slidably fitted to said housing means for rotatably mounting said wheel to said housing means;
    said axle means having a shoulder thereon bearing against one of said thrust bearing surfaces;
    said housing means having an annular surface facing and engaging the other of said thrust bearing surfaces;
    means for axially biasing said axle toward said annular surface, thereby to inhibit nutation as said wheel is rotated.

* * * * *